United States Patent
Yamamoto et al.

(10) Patent No.: US 7,994,436 B2
(45) Date of Patent: Aug. 9, 2011

(54) BASE UNIT FOR DUAL WIRING SYSTEM

(75) Inventors: Masahiro Yamamoto, Kobe (JP); Takeshi Ueno, Kobe (JP); Kazufumi Oogi, Ibaraki (JP); Kenichi Yoneyama, Portland (JP); Hideshi Hamaguchi, Beaverton (JP)

(73) Assignee: Panasonic Electric Works Co., Ltd., Kadoma-shi (JP)

( * ) Notice: Subject to any disclaimer, the term of this patent is extended or adjusted under 35 U.S.C. 154(b) by 539 days.

(21) Appl. No.: 11/988,286

(22) PCT Filed: Dec. 22, 2005

(86) PCT No.: PCT/JP2005/024200
§ 371 (c)(1),
(2), (4) Date: Apr. 7, 2008

(87) PCT Pub. No.: WO2007/007432
PCT Pub. Date: Jan. 18, 2007

(65) Prior Publication Data
US 2008/0196936 A1    Aug. 21, 2008

(30) Foreign Application Priority Data

Jul. 8, 2005  (JP) ................. 2005-200990
Jul. 8, 2005  (JP) ................. 2005-200991
Jul. 8, 2005  (JP) ................. 2005-200992
Jul. 8, 2005  (JP) ................. 2005-200993
Jul. 8, 2005  (JP) ................. 2005-200994

(51) Int. Cl.
*H05K 5/00* (2006.01)
(52) U.S. Cl. .............. 174/520; 174/50; 174/53; 174/57; 220/3.2; 220/3.3; 307/149; 361/679.01

(58) Field of Classification Search ............... 174/50, 174/53, 57, 58, 520, 480, 481; 220/3.2–3.9, 220/4.02; 439/535, 107, 397, 638, 135, 136, 439/137; 307/38, 31, 39, 149; 340/5.5, 10.5, 340/310.11, 656; 361/600, 601, 679.01, 361/728, 93.1
See application file for complete search history.

(56) References Cited

U.S. PATENT DOCUMENTS
2,433,917 A * 1/1948 McCartney ............ 174/53
(Continued)

FOREIGN PATENT DOCUMENTS
DE          29504491        6/1995
(Continued)

OTHER PUBLICATIONS

Written Opinion of the International Searching Authority for PCT/JP2005/024200.
(Continued)

*Primary Examiner* — Angel R Estrada
(74) *Attorney, Agent, or Firm* — Edwards Angell Palmer & Dodge LLP

(57) ABSTRACT

A base unit suitable to improve easy exchangeability of a function unit in a dual wiring system is provided. The base unit is mounted in a wall surface of a structure, and connected to both of an electric power line and an information line previously installed in the structure. The base unit has a module port, which is detachably connected to a module connector of the function unit to simultaneously establish both of supplying the electric power from the base unit to the function unit, and making a signal transmission between the base unit and the function unit, thereby enabling the function unit to provide at least one of functions for supplying electric power from the electric power line, outputting information from the information line and inputting information into the information line when connected with the base unit.

6 Claims, 8 Drawing Sheets

U.S. PATENT DOCUMENTS

| | | | |
|---|---|---|---|
| 3,609,647 A * | 9/1971 | Castellano | 439/535 |
| 3,879,101 A * | 4/1975 | McKissic | 439/535 |
| 4,665,544 A | 5/1987 | Honda et al. | |
| 4,725,249 A * | 2/1988 | Blackwood et al. | 439/535 |
| 4,842,551 A * | 6/1989 | Heimann | 174/58 |
| 5,114,365 A | 5/1992 | Thompson et al. | |
| 5,359,143 A | 10/1994 | Simon et al. | |
| 5,383,799 A | 1/1995 | Fladung | |
| 5,650,771 A * | 7/1997 | Lee | 340/656 |
| 6,036,516 A | 3/2000 | Byrne | |
| 6,369,707 B1 | 4/2002 | Neer | |
| 6,379,182 B1 | 4/2002 | Byrne | |
| 6,420,964 B1 | 7/2002 | Nishikawa et al. | |
| 6,429,779 B1 | 8/2002 | Petrillo et al. | |
| 6,544,049 B1 * | 4/2003 | Pierson, Jr. | 439/107 |
| 6,624,532 B1 | 9/2003 | Davidow et al. | |
| 6,747,859 B2 * | 6/2004 | Walbeck et al. | 361/93.1 |
| 6,759,759 B2 | 7/2004 | Kojima et al. | |
| 6,778,308 B2 | 8/2004 | Otsuka et al. | |
| 6,855,881 B2 | 2/2005 | Khoshnood | |
| 6,993,417 B2 | 1/2006 | Osann, Jr. | |
| 7,034,225 B2 | 4/2006 | Thompson et al. | |
| 7,194,639 B2 | 3/2007 | Atkinson et al. | |
| 7,420,459 B2 | 9/2008 | Pruchniak | |
| 7,425,677 B2 * | 9/2008 | Gates et al. | 174/50 |
| 7,697,268 B2 * | 4/2010 | Johnson et al. | 174/53 |
| 7,761,555 B1 | 7/2010 | Bishel | |
| 7,772,717 B2 * | 8/2010 | Kitamura et al. | 439/638 |
| 2001/0046815 A1 | 11/2001 | Luu | |
| 2003/0050737 A1 | 3/2003 | Osann, Jr. | |
| 2004/0121648 A1 | 6/2004 | Voros | |
| 2005/0076148 A1 | 4/2005 | Chan et al. | |
| 2005/0094786 A1 | 5/2005 | Ossa | |
| 2005/0126812 A1 | 6/2005 | Plankell | |
| 2006/0270284 A1 | 11/2006 | Youden | |
| 2009/0051505 A1 | 2/2009 | Yamamoto et al. | |

FOREIGN PATENT DOCUMENTS

| | | |
|---|---|---|
| DE | 29924724 | 3/2005 |
| EP | 0776108 | 5/1997 |
| JP | 58-060331 | 4/1983 |
| JP | 61-065555 | 4/1986 |
| JP | 64-002459 | 1/1989 |
| JP | 03-071581 A | 3/1991 |
| JP | 04-090293 | 3/1992 |
| JP | 06-078365 | 3/1994 |
| JP | 06-165338 A | 6/1994 |
| JP | 08-298690 | 11/1996 |
| JP | 10-012337 | 1/1998 |
| JP | 10-136104 | 5/1998 |
| JP | 10-208804 A | 8/1998 |
| JP | 10-304467 A | 11/1998 |
| JP | 11-187154 | 7/1999 |
| JP | 11-290402 | 10/1999 |
| JP | 2000-306643 A | 11/2000 |
| JP | 2000-348825 A | 12/2000 |
| JP | 2003-134681 | 5/2003 |
| JP | 2004-191883 | 7/2004 |
| JP | 2004-304617 | 10/2004 |
| KR | 1998-061153 | 11/1998 |
| WO | WO-2005/078871 A1 | 8/2005 |

OTHER PUBLICATIONS

International Search Report for PCT Application No. PCT/JP2005/023873 mailed Jan. 31, 2006.
International Search Report for PCT Application No. PCT/JP2005/024199 mailed Apr. 28, 2006.
Written Opinion of the International Searching Authority for PCT/JP2005/024199.
International Search Report for PCT Application No. PCT/JP2005/024200 mailed May 10, 2006.
International Search Report for PCT Application No. PCT/JP2005/024198 mailed Apr. 27, 2006.
Ris H R: "EIB-Bus-Europäischer Installationsbus Teil 2," Elektrotechnik, Vogel Verlag K.G. Wurzburg, DE, No. 7/8. Jan. 1993, pp. 61-67, XP000567405 ISSN: 1431-9578.
International Search Report for PCT Application No. PCT/JP2005/024194 mailed May 9, 2006.
Written Opinion of the International Searching Authority for PCT/JP2005/024194.
Written Opinion of the International Searching Authority for PCT/JP2005/024198.
Japanese Office Action mailed May 26, 2009, issued on the Japanese application No. 2006-515421 and the English translation thereof.
Japanese Office Action mailed Jan. 27, 2009, issued on the Japenese application No. 2006-515411 and the English translation thereof.
Korean Office Action dated Jul. 17, 2009 issued in Korean Patent Appln. No. 10-2008-7002541 and the brief English translation thereof.
Korean Examination Report dated Jan. 21, 2010, issued for the corresponding Korean patent application No. 10-2008-7002539.

* cited by examiner

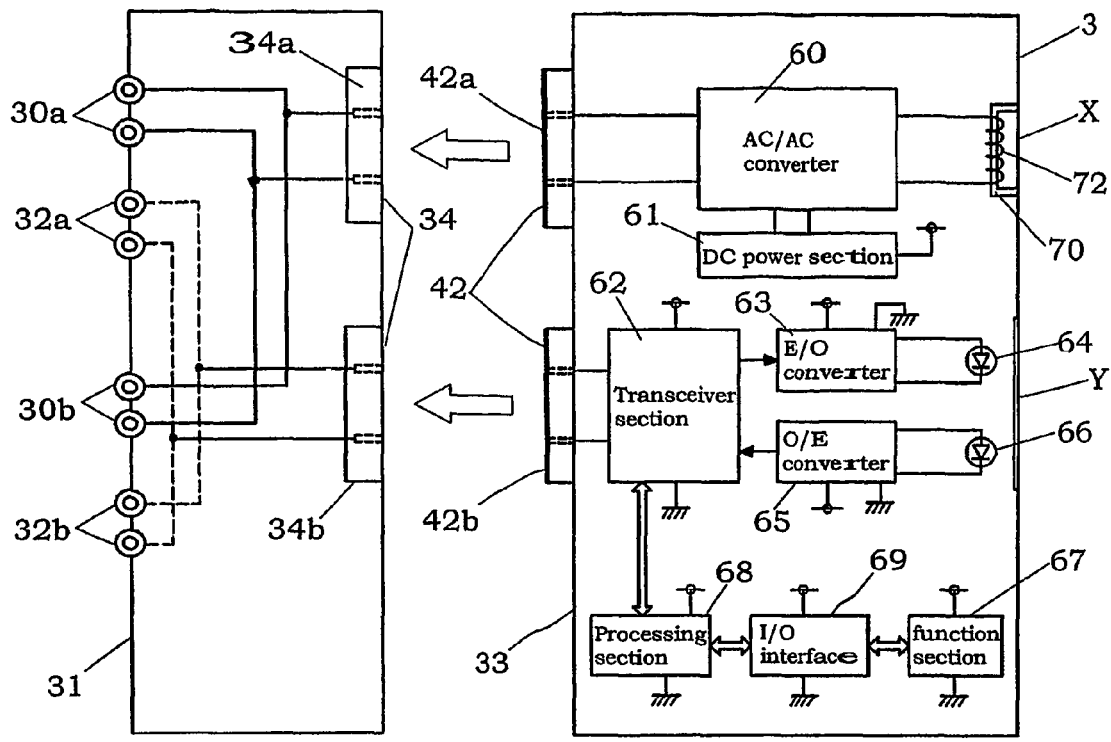
FIG. 4
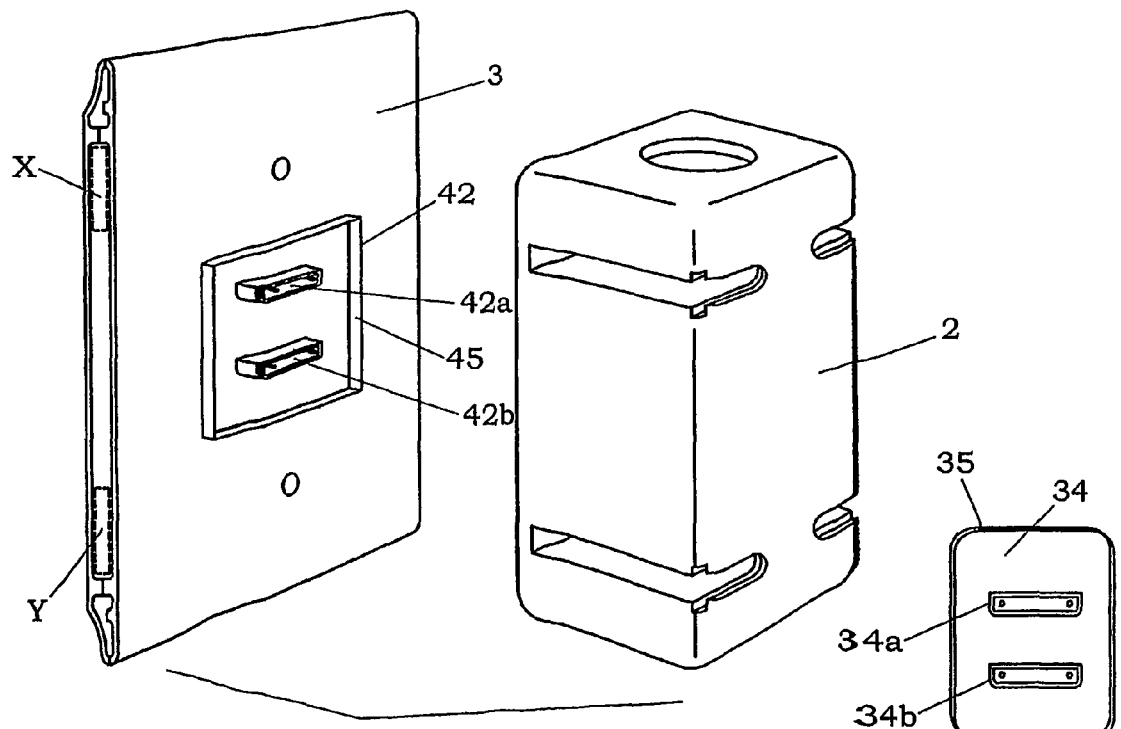
FIG. 5A
FIG. 5B

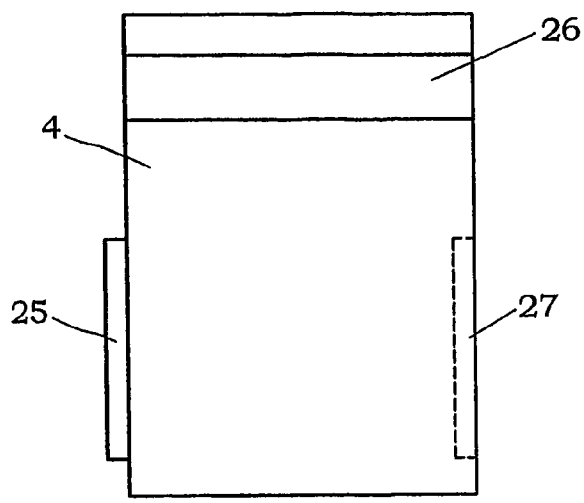
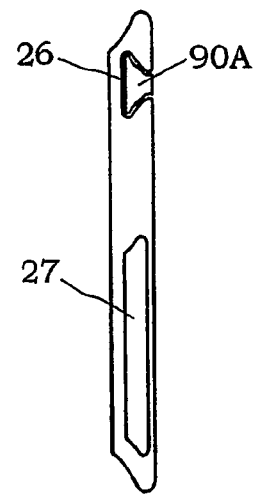
FIG. 11A  FIG. 11B
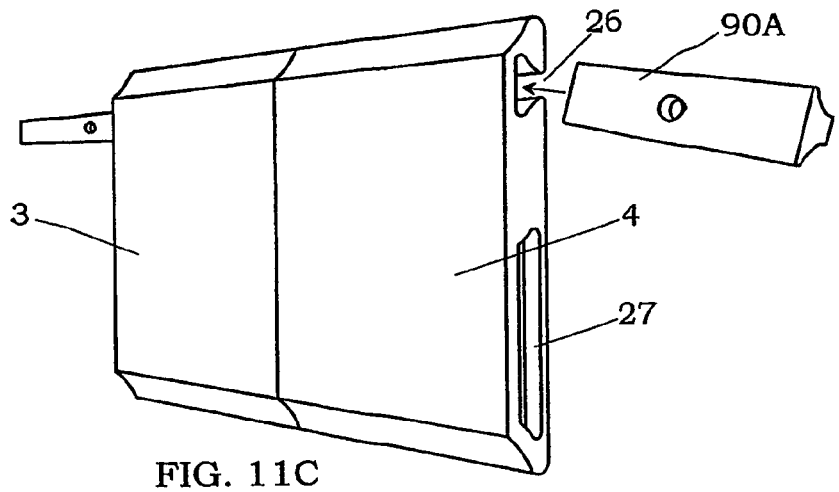
FIG. 11C
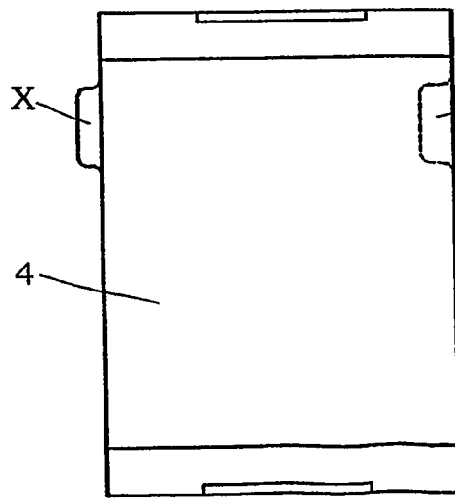
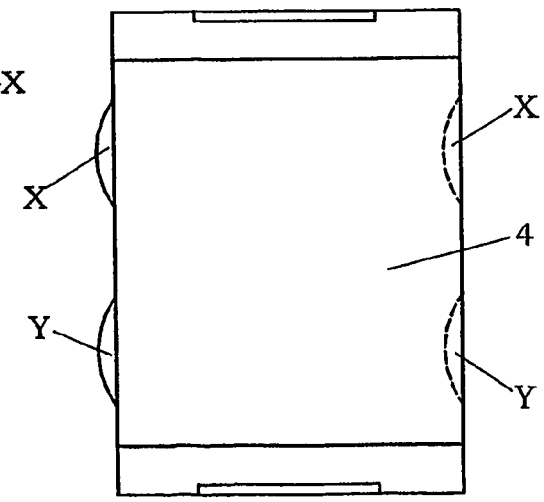
FIG. 12A  FIG. 12B

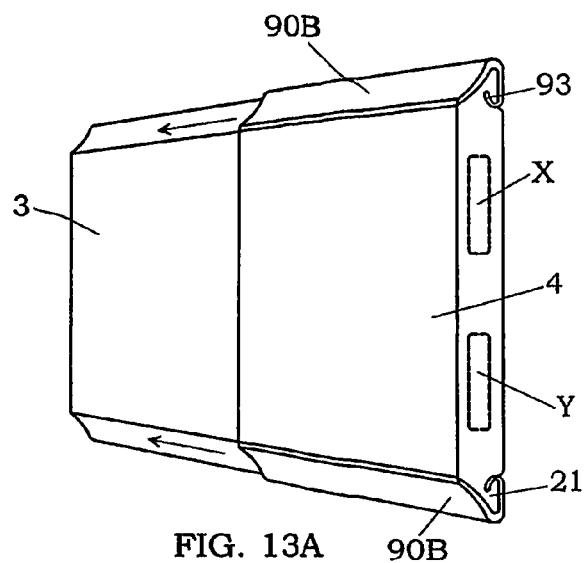
FIG. 13A
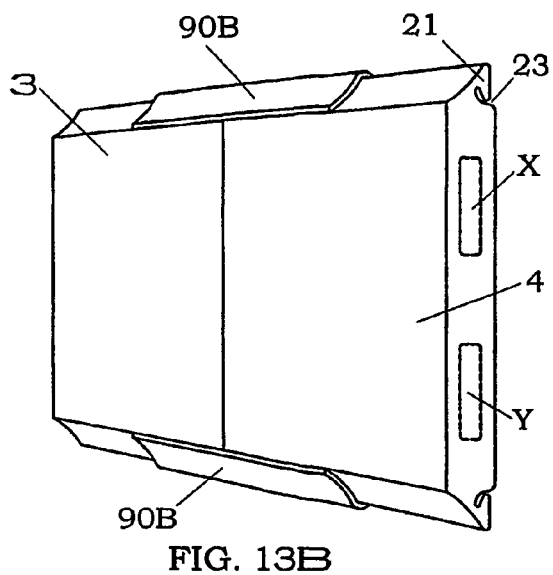
FIG. 13B
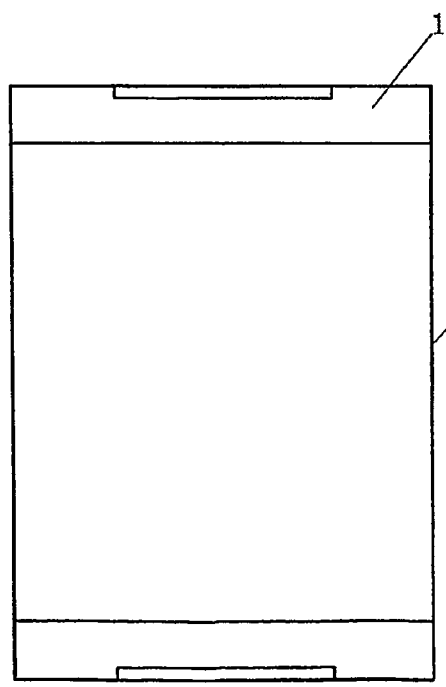
FIG. 14A
FIG. 14B
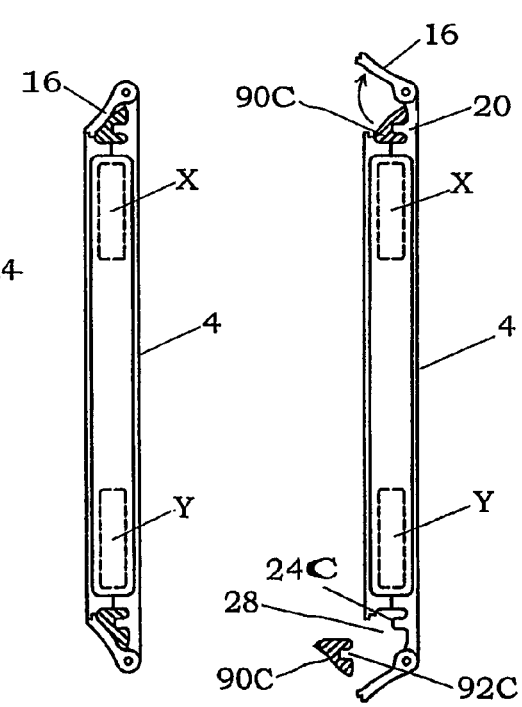
FIG. 14C

BASE UNIT FOR DUAL WIRING SYSTEM

CROSS REFERENCE TO RELATED APPLICATIONS

This application is related to four applications: "DUAL WIRING SYSTEM" filed even date herewith in the names of Masahiro YAMAMOTO et al. as a national phase entry of PCT/JP2005/024194 filed Dec. 22, 2005; "DUAL WIRING SYSTEM" filed even date herewith in the name of Masahiro YAMAMOTO et al. as a national phase entry of PCT/JP2005/024198 filed Dec. 22, 2005; "DUAL WIRING SYSTEM" filed even date herewith in the name of Tsunehiro KITAMURA et al. as a national phase entry of PCT/JP2005/023873 filed Dec. 27, 2005; and "FUNCTION UNIT FOR DUAL WIRING SYSTEM" filed even date herewith in the name of Masahiro YAMAMOTO et al. as a national phase entry of PCT/JP2005/024199 filed Dec. 22, 2005; all of which claim Japan application Nos. 2005-200990, 2005-200991, 2005-200992, 2005-200993, and 2005-200994 all filed Jul. 8, 2005, which applications are assigned to the assignee of the present application and all four incorporated by reference herein.

TECHNICAL FIELD

The present invention relates to a dual wiring system, which can be used for the supply of electric power and the input and output of information through an electric power line and a signal line installed in a structure.

BACKGROUND ART

Due to popularization of the Internet, it has been demanded to ensure the accessibility to information networks at many locations in building structures such as general houses and office buildings. For example, Japanese Patent Early Publication [kokai] No. 11-187154 discloses a multimedia g system having a distribution board for controlling an electric power line and various kinds of signal lines installed in a structure in a centralized control manner, and a multimedia receptacle panel, which is adapted in use to be mounted in an indoor wall surface, and connected to the distribution panel through the electric power line and the signal lines. For example, the multimedia receptacle panel has a power receptacle for supplying commercial electric power to an electric appliance, receptacle for receiving broadcasting programs such as ground wave broadcasting, satellite broadcasting, and cable television, modular jacks for analog and digital lines used for the Internet and telephone communication. By use of this multimedia wiring system, the convenience of multimedia products is enhanced to obtain comfortable living and working environments in the information society.

By the way, the above-described multimedia receptacle panel is usually mounted in the wall surface, and connected to the electric power line and the signal lines under construction works of the building structures. This means that the functions of the multimedia receptacle panel are determined at the time of the construction works. Therefore, after the construction works are finished, it is difficult to add a new function to the multimedia receptacle panel or exchange a part of the functions of the existing multimedia receptacle panel for another function. In addition, when exchanging the existing multimedia receptacle panel for another multimedia panel, a repair work is needed. However, such a repair work is not easy for general users to perform, and the costs of the repair work become a burden to the user.

Thus, the conventional multimedia receptacle panel still has plenty of room for improvement from the viewpoints of easy exchangeability and function expandability.

SUMMARY OF THE INVENTION

Therefore, a primary concern of the present invention is to provide a base unit suitable for a dual wiring system with improved function expandability and easy exchangeability.

That is, the base unit for the dual wiring system of the present invention is adapted in use to be mounted in a wall surface of a structure, and connected to both of an electric power line and an information line installed in the structure. The base unit is characterized by having one of a module connector and a module port, which is detachably connected to the other one of the module connector and the module port formed in a function unit to simultaneously establish both of supplying the electric power from the base unit to the function unit, and making a signal transmission between the base unit and the function unit, thereby enabling the function unit to provide at least one of functions for supplying an electric power from the electric power line, outputting information from the information line, and inputting information into the information line.

According to the present invention, since both of the supply of electric power from the base unit to the function unit and the mutual communication of the information signal between the base unit and the function unit can be simultaneously obtained by the connection between the module connector and the module port, a general user can easily exchange the function unit already connected to the base unit for another function unit without performing a laborious repair work. In addition, when a plurality of base units are mounted in wall surfaces at plural locations in the structure, each of the base units are sharable among a plurality of function units having various kinds of functions such as receptacle, switch, sensor, controller, monitor and speaker. Therefore, an increased degree of freedom of layout of the function units provides comfortable and convenient living and working environments to meet the user's needs.

In the above base unit for the dual wiring system, it is preferred that the module connector and the module port have a pair of an electric power connector and an electric power port, which are detachably connected to each other to supply the electric power from the base unit to the function unit, and a pair of an information signal connector and an information signal port, which are detachably connected to each other to make the signal transmission between the base unit and the function unit. In particular, it is preferred that the electric power port and the electric power connector are configured to supply the electric power from the base unit to the function unit by means of electromagnetic coupling, and the information signal port and the information signal connector are configured to make the signal transmission between the base unit and the function unit by means of optical coupling. In this case, since the electric power transmission and the signal transmission between the base unit and the function unit are performed in a noncontact manner by means of the electromagnetic and optical couplings, it is possible to minimize transmission loss of the electric power and/or the electric signal therebetween, and operate the function unit with reliability.

In addition, it is preferred that the base unit has a housing, which is formed with a rear portion having terminals to be connected to the electric power line and the information line, front portion having at least one of an outlet configured to receive a power plug of an electric appliance, and a switch configured to turn on/off the electric appliance, and a side portion having the one of the module connector and the module port such that the function unit is detachably connected to the base unit in a direction along the wall surface. In this case, it is possible to improve function expandability in the dual wiring system without spoiling the beauty in the interior spaces. Alternatively, the base unit may have a housing, which is formed with a rear portion having terminals to be connected to the electric power line and the information line, and a front portion having the one of the module connector and the module port.

Moreover, it is preferred that the base unit of the present invention further includes a joining means configured to mechanically connect the function unit to the base unit. For example, the joining means is formed with an engaging portion such as elongated projection and groove formed on the base unit, and a joining member configured to slidably contact the engaging portion and make the mechanical connection between the base unit and the function unit when a region of the joining member is engaged to the engaging portion of the base unit and the remaining region of the joining member is engaged to an engaging portion formed on the function unit. In this case, it is possible to improve the reliability of the supply of electric power and the mutual communication of the information signal between the base unit and the function unit, and prevent an accidental falling of the function unit from the base unit.

These and additional features of the present invention and advantages brought thereby will become more apparent from the following preferred embodiments, referring to the attached drawings.

BRIEF EXPLANATION OF THE DRAWINGS

FIG. 4 is a schematic circuit diagram of another base unit comprised of main and gate housings;

FIG. 5A is a perspective view of the main housing of FIG. 4, and FIG. 5B is a module port formed in the gate housing of FIG. 4;

FIGS. 11A and 11B are front and side views of the function unit according to a first modification of the embodiment, and FIG. 11C is a perspective view illustrating how to use the joining member;

FIGS. 12A and 12B are front views of another examples of the function unit;

FIGS. 13A and 13B are perspective views illustrating how to make a connection between the base unit and the function unit according to a second modification of the embodiment; and FIGS. 14A to 14C are front and side views of the function unit according to a third modification of the embodiment.

DETAIL DESCRIPTION OF PREFERRED EMBODIMENTS OF THE INVENTION

A base unit for dual wiring system of the present invention is explained in detail according to the following preferred embodiments.

Figure 1:
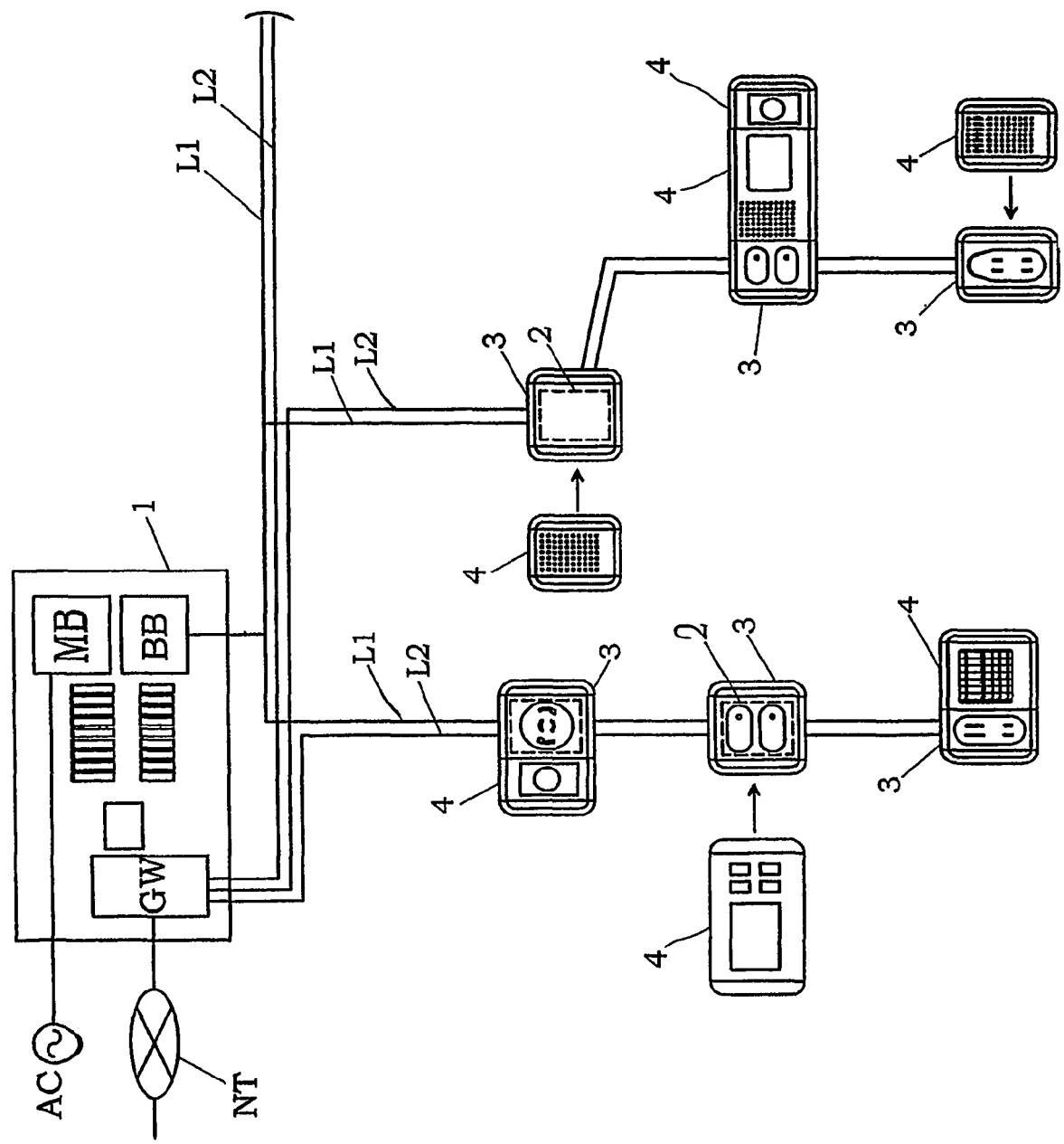
FIG. 1 is a schematic diagram of a dual wiring system according to a preferred embodiment of the present invention.

As shown in FIG. 1, the dual wiring system of this embodiment has a power supply line L1 and an information line L2 installed in a building structure, which are connected to commercial power source AC and the internet network NT through a distribution board 1, switch boxes 2 embedded in wall surfaces at plural locations in the building structure, base units 3 mounted in the switch boxes and connected to the power supply line L1 and the information line L2, and a plurality of function units 4 each having the capability of providing at least one of functions for supplying electric power from the electric power line L1, outputting information from the information line L2 and inputting information into the information line L2 when connected with one of the base units 3. In the present specification, the wall is not limited to the sidewall formed between adjacent rooms. That is, the wall includes exterior wall and interior wall of the building structure, and the interior wall includes the sidewall, ceiling and floor. In FIG. 1, "MB" designates a main breaker, "BB" designates a branched breaker, and "GW" designates a gateway (e.g., router or built-in hub).

Figure 2:
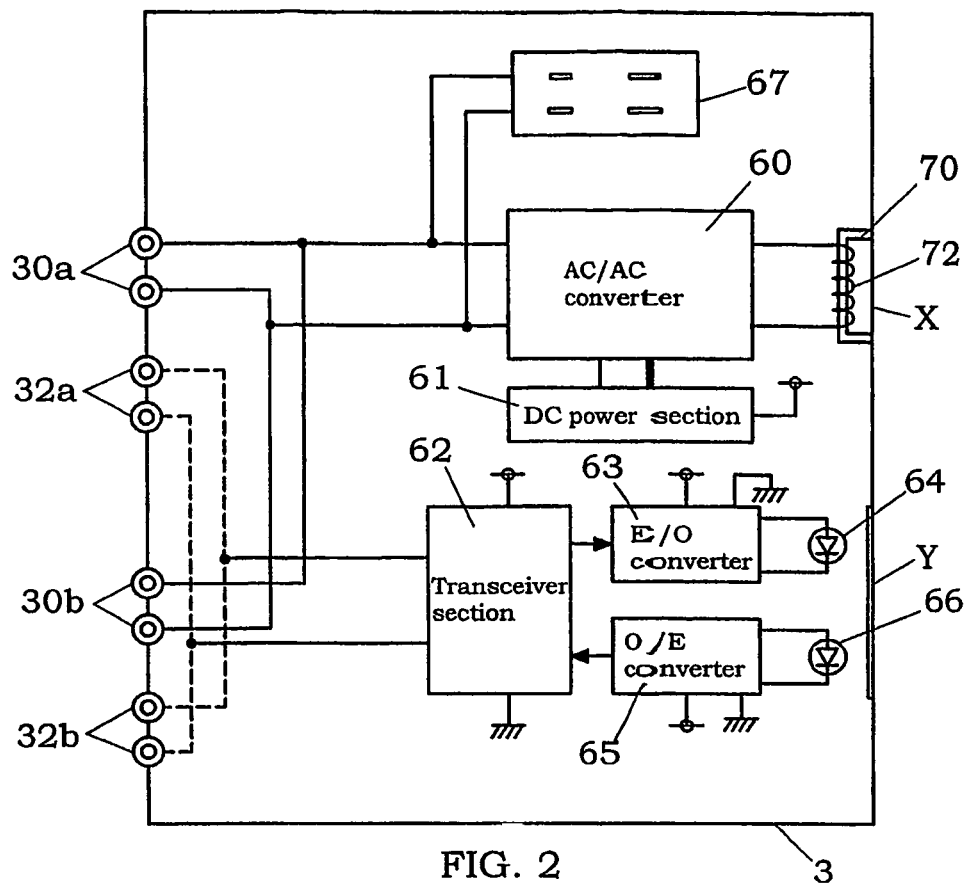
FIG. 2 is a schematic circuit diagram of a base unit for the dual wiring system.
Figure 3:
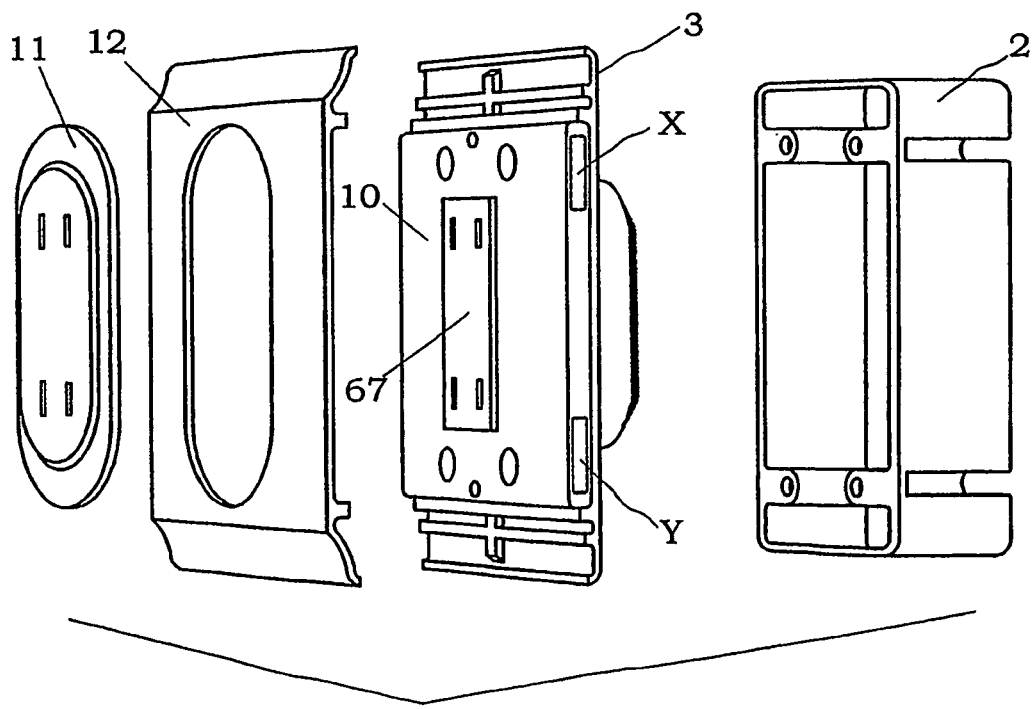
FIG. 3 is an exploded perspective view of the base unit.

As shown in FIG. 2, each of the base units 3 has terminals (30a, 32a) connected to the power supply line L1 and the information line L2, and bus-wiring terminals (30b, 32b) at its rear surface. As shown in FIG. 3, the base unit 3 is fixed to the switch box 2 by use of conventional fastening means such as screws. In FIG. 3, the numeral 12 designates a cosmetic cover detachably attached to a front surface of the base unit, and the numeral 11 designates a receptacle cover independently provided from the cosmetic cover 12. Circuit components of the base unit 3 are designed to transmit the electric power and the information signal to the function unit 4. For example, the base unit 3 of FIG. 2 is provided with an AC/AC converter 60, DC power section 61, transceiver section 62, E/O converter 63, and O/E converter 65.

The AC/Ac converter 60 converts commercial AC voltage to a lower AC voltage having an increased frequency, and applies the lower AC voltage to a coil 72 wound around a core 70. The DC power section 61 generates an operating voltage of the internal circuit components from a stable DC voltage obtained by rectifying and smoothing the lower AC voltage. The transceiver section 62 transmits and receives the information signal for enabling the mutual communication through the information line L2. The E/O converter 63 converts the information signal received from the information line L2 to an optical signal, and outputs the optical signal though a light emitting device (LED) 64. On the other hand, the O/E converter 65 receives the optical signal provided from the outside, e.g., the function unit 4 by a light receiving device (PD) 66, and converting the received optical signal into the information signal to transmit it to the transceiver section 62. In FIG. 2, the numeral 67 designates a function section such as power receptacles. If necessary, the function unit 67 may be omitted.

In addition, another base unit 3 shown in FIG. 4 may be used. This base unit 3 is formed with a gate housing 31 having terminals (30a, 32a, 30b, 32b) connected to the power supply line L1 and the information line L2, and a main housing 33 detachably connected to the function unit 4. The gate housing 31 and the main housing 33 have a pair of a module port 34 and a module connector 42, which are detachably connected to each other to simultaneously establish both of supplying the electric power from the gate housing to the main housing, and making a signal transmission between the gate housing and the main housing. In addition, a function unit having the module connector 42 may be detachably attached to the module port 34 of the gate housing 31 in place of the main housing 33. In this case, the gate housing 31 having the module port 34 satisfies the definition of the base unit.

The module port 34 formed at its front surface of the gate housing 31 is composed of an electric power port 34a for supplying the electric power and an information signal port 34b for accessing the information line, as shown in FIG. 5B. In the module port 34, an arrangement of the electric power port 34a and the information signal port 34b, and a shape of each of those ports are standardized (normalized) in the dual wiring system. For example, as shown in FIG. 5B, each of the electric power port 34a and the information signal port 34b is configured in a substantially rectangular shape such that they are arranged in parallel to each other.

On the other hand, the module connector 42 formed at its rear surface of the main housing 33 is composed of an electric power connector 42a and an information signal connector 42b, as shown in FIGS. 4 and 5A. In the module connector 42, an arrangement of the electric power connector 42a and the information signal connector 42b, and a shape of each of those connectors are standardized (normalized) in the dual wiring system of this embodiment. For example, as shown in FIG. 5A, each of the electric power connector 42a and the information signal connector 42b is configured in a substantially rectangular shape such that they are arranged in parallel to each other.

In this embodiment, the module port 34 also has a guide portion 35 such as a ring-like wall or a ring-like groove extending around the electric power port 34a and the information signal port 34b. This guide portion 35 is formed to be engageable to an engaging portion 45 such as a ring-like wall of the module connector 42, which is formed on the rear surface of the main housing 33. Since the electric power connector 42a and the information signal connector 42b are simultaneously connected to the electric power port 34a and the information signal port 34b by simply engaging the engaging portion 45 to the guide portion 35, it is possible to improve the removability of the main housing 33. The module port 34 and the module connector 42 may be formed by female and male connectors.

In addition, the base unit 3 of FIG. 4 is designed to have a sensor function or a controller function as the function section 67. That is, a processing section 68 and I/O interface 69 are formed between the transceiver section 62 and the function section 67. The processing section 68 has functions of performing a signal processing of the information signal received by the transceiver section 62 to transmit the processed signal to the function section 67 through the I/O interface 69, and receiving the data signal provided from the function section 67 to output as the information signal. Electric power needed to energize the transceiver section 62, processing section 68 and the function section 67 is supplied from the DC power section 61. When an AC/DC converter for converting the commercial AC voltage into a required DC voltage is used in place of the AC/AC converter 60, the DC power section 61 can be omitted. The other circuit components in FIG. 4 are substantially the same as them of FIG. 2. Therefore, duplicate explanations are omitted.

The function unit 4 is optionally designed to provide a desired function by using the electric power provided to the function unit 4 through the base unit 3 and the mutual communication of the information signal between the function unit 4 and the information line L2 through the base unit 3. For example, when the function unit 4 is connected to the base unit 3 mounted in the wall surface at a high position near the ceiling, it preferably has a receptacle function of receiving a plug with hook of a lighting apparatus, security function such as a motion sensor, temperature sensor, and monitoring camera, or a sound function such as speaker. In addition, when the function unit 4 is connected to the base unit 3 mounted in the wall surface at a middle height, at which the function unit 4 can be easily operated by the user, it preferably has a switch function of turning on/off the lighting apparatus, control function for electric appliances such as air-conditioning equipments, or display function such as liquid crystal display. In addition, when the function unit 4 is connected to the base unit 3 mounted in the wall surface at a low position near the floor, it preferably has a receptacle function for receiving a plug of an electric appliance such as electric vacuum cleaner, the sound function such as speaker, or a footlight function.

Figure 6:
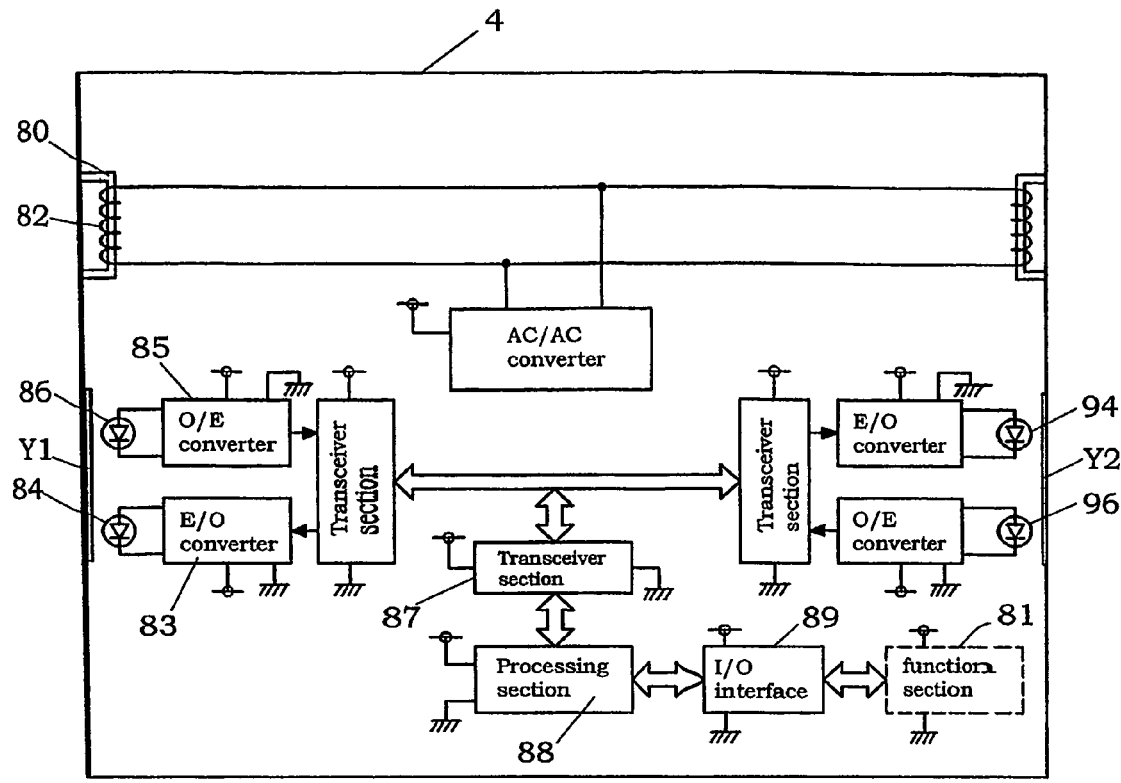
FIG. 6 is a schematic circuit diagram of a function unit for the dual wiring system.

Specifically, as shown in FIG. 6, when the function section 81 is formed by a switch, operation data obtained by operating the switch is transmitted to the processing section 88 through the I/O interface 89. Then the processed data is sent to, for example, an infrared remote controller (not shown) through the transceiver section 87, so that an electric appliance to be controlled is turned on/off by receiving a remote control signal emitted from the infrared remote controller. In addition, when the function section 81 is formed by a sensor, data detected by the sensor is transmitted as the information signal to the information line L2, and then informed to the user by a required communicator. When the function section 81 is formed by a speaker, sound data provided as the information signal through the information line L2 is output from the speaker. When the function section 81 is formed by a monitoring camera, compression encoding of image data taken by the monitoring can era is performed, and then output as the information signal. Furthermore, when the function section 81 is formed by a monitor, image data provided through the information line L2 is decoded, and then displayed on the monitor. When the function section 81 is simply formed by the power receptacle, the processing section 88 and the I/O interface 89 can be omitted. Thus, since the function units 4 having various kinds of the function sections 81 can be detachably used in the dual wiring system, the degree of freedom of layout of the function units 4 can be remarkably improved.

The coil 72 wound around the core 70 in the base unit 3 is used as a power transmission means for supplying electric power from the base unit 3 to the function unit 4 in a noncontact manner. That is, the coil 72 wound around the core 70 of the base unit 3 provides an electromagnetic coupling portion that works as a first side of a transformer. On the other hand, as shown in FIG. 6, the function unit 4 has an electromagnetic coupling portion comprised of a coil 82 wound around a core 80, which works as a second side of the transformer. Therefore, by forming electromagnetic coupling between the base unit 3 ad the function unit 4, a low AC voltage is induced in the coil 82 of the function unit 4 to achieve the supply of electric power from the base unit 3 to the function unit 4. In this embodiment, since the low AC voltage having the higher frequency than the commercial AC voltage is obtained by the AC/AC converter 60, the electromagnetic coupling portions used as the transformer can be downsized.

In addition, the light emitting device (LED) 64 of the E/O converter 63 of the base unit 3 is used to transmit the optical signal as the information signal to the function unit 4 in a noncontact manner. In this case, as shown in FIG. 6, a light receiving device (PD) 86 is disposed in the function unit 4 such that the light emitting device 64 of the base unit 3 is in a face-to-face relation with the light receiving device 86 of the function unit 4 when the function unit 4 is connected to the base unit 3. Similarly, to transmit the optical signal as the information signal from the function unit 4 to the base unit 3, the function unit 4 has a light emitting device (LED) 84, which is disposed to be in the face-to-face relation with the light receiving element (PD) 66 of the base unit 3 when the function unit 4 is connected to the base unit 3. Thus, each of the base unit 3 and the function unit 4 has the pair of the E/O converter (63, 83) and the O/E converter (65, 85) as an optical coupling portion to enable the mutual communication of the information signal therebetween.

As shown in FIGS. 2 and 3, the electromagnetic coupling portion X used for the supply of electric power and the optical coupling portion Y used for the mutual communication of the information signal are disposed at a side surface of each of the function units 4 to be spaced from each other by a constant distance. In addition, shapes of the electromagnetic coupling portion X and the optical coupling portion Y are standardized (stylized) to make each of the base units 3 shareable among the function units 4. In addition, the pair of the electromagnetic coupling portion X and the optical coupling portion Y are formed at each of both sides of the function unit 4, as shown in FIG. 6. That is, the optical coupling portion Y1 formed at one side (e.g., left side) of the function unit 4 is composed of the light receiving device 86 located at the upper side and the light emitting device 84 located at the lower side, and the optical coupling portion Y2 formed at the opposite side (e.g., right side) of the function unit 4 is composed of a light emitting device 94 located at the upper side and a light receiving device 96 located at the lower side.

In this case, even when a plurality of function units 4 are connected in series to the base unit 3, it is possible to ensure the mutual communication of the information signal between the function units 4 as well as between the function unit 4 and the base unit 3. It is also preferred that a light transparent cover is attached to the respective optical coupling portion (Y, Y1, Y2) to protect the optical devices. As shown in FIG. 6, the function unit 4 has circuit components for achieving the power supply and the mutual communication of the information signal between adjacent function units 4. However, since they are substantially the same as the circuit components used in the base unit 3, duplicate explanations of the same circuit components are omitted.

As shown in FIG. 3, when the function section 67 (e.g., power receptacle) is formed at the front surface of the base unit 3, and the pair of the electromagnetic coupling portion X and the optical coupling portion Y is formed in the side surface of the base unit 3, the function units 4 can be connected to the base unit 3 along the wall surface (i.e., in parallel with the wall surface). Therefore, it is possible to improve function expandability in the dual wiring system without spoiling the beauty in the interior spaces.

Figures 7A, 7B:
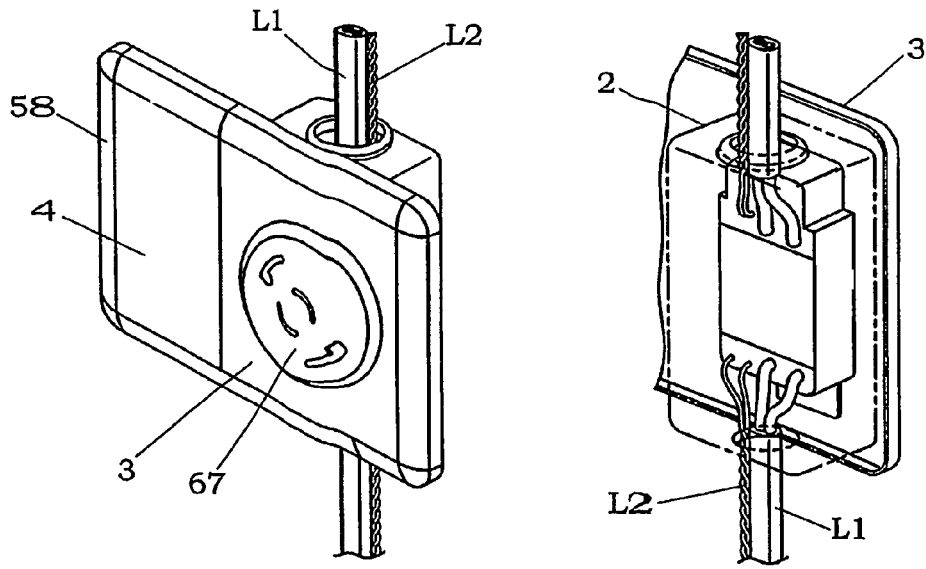
FIGS. 7A and 7B are front and rear perspective views of the function unit connected to the base unit.

Examples of the function unit(s) 4 connected to the base unit 3 are introduced below. In FIGS. 7A and 7B, the base unit 3 has a special receptacle for a plug with hook of a lighting apparatus as the function section 67. The function unit 4 connected to the base unit 3 has a function of emitting an infrared remote signal. In this case, operation data obtained when another function unit having a controller as the function section is operated by a user is transmitted to the functional unit 4 of FIG. 7A through the information line L2, so that the infrared remote signal is emitted toward an infrared signal receiving portion of an electric appliance such as air-conditioning equipment. In FIG. 7A, the numeral 58 designates a protection cover detachably attached to the side of the function unit 4 to protect the electromagnetic coupling portion X and the optical coupling portion Y when not used. In addition, when the base unit 3 has the power receptacle, a relay or a semiconductor switch may be connected to a circuit for the power receptacle such that the function of the power receptacle can be cancelled when the relay or the semiconductor switch is operated according to a control signal transmitted from another function unit.

Figure 8:
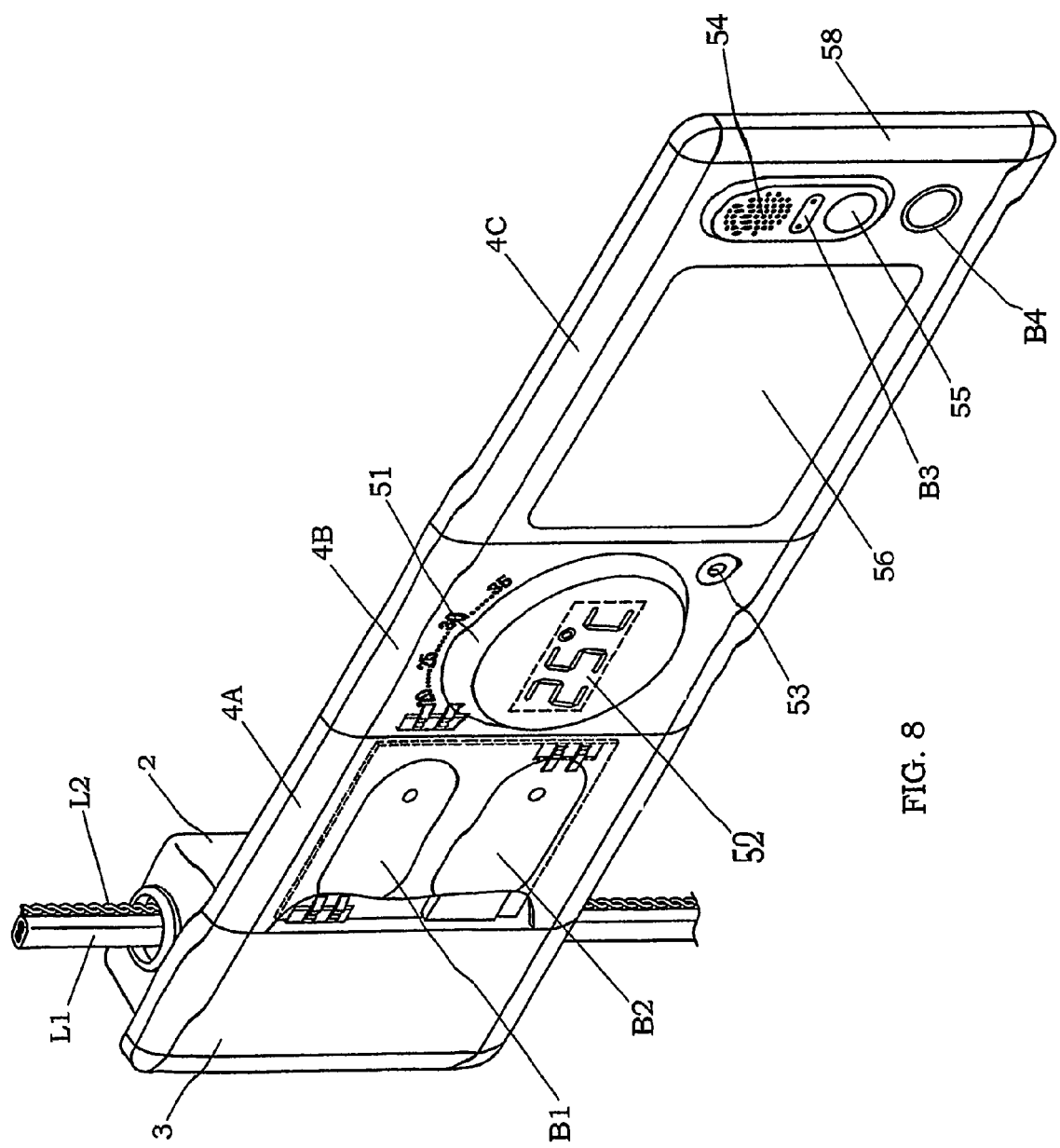
FIG. 8 is a perspective view of a plurality function units connected to the base unit.

In FIG. 8, first to third function units (4A, 4B, 4C) are connected to the base unit 3. In this case, the base unit 3 has no function section. The first additional function unit 4A detachably connected to the base unit 3 has switches for turning on/off an air-conditioning equipment as the function section 81. The second function unit 4B detachably connected to the first function unit 4A has a controller of the air-conditioning equipment as the function section 81. In addition, the third function unit 4C detachably connected to the second function unit 4B has a main unit of an intercom system as the function section 81.

The first function unit 4A is provided with an operation button B1, stop button B2, and a CPU section for preparing the data according to the operation of these buttons and transmitting the prepared data to the processing section through the I/O interface. This function unit is preferably used to operate a lighting apparatus. The second function unit 4B is provided with a temperature setting dial 51 for the air-conditioning equipment, LCD (liquid crystal display) monitor 52 for displaying the setting temperature, timer switch 53 for operating the air-conditioning equipment for a desired time period, and a CPU section for preparing operation data according to the operation of the temperature setting dial 51 and the operation of the timer switch 53, transmitting the operation data to the processing section through the I/O interface, and preparing the data to be displayed on the LCD monitor 52.

The third function unit 4C is provided with a volume control button B3, speaker 54, mode switch 55 for switching between the transmitter function and the receiver function of the speaker 54, LCD screen 56 for displaying the image taken by a TV camera placed at the entrance, release button B4 for releasing the door lock, and a CPU section having a sound processing function for the speaker 54, image processing function for the LCD screen 56, and the functions of preparing operation data according to the operations of the release button B4 and the mode switch 55, and transmitting the prepared operation data to the processing section through the I/O interface. The function sections 81 of the function units 4 are not limited to the above examples. For example, a battery charger for electric shaver, electric toothbrush, mobile phone and portable audio player may be formed as the function section. In addition, the function unit 4 having a handset function of the intercom system may be connected to the base unit 3 mounted in an exterior wall surface at the entrance.

Figure 9:
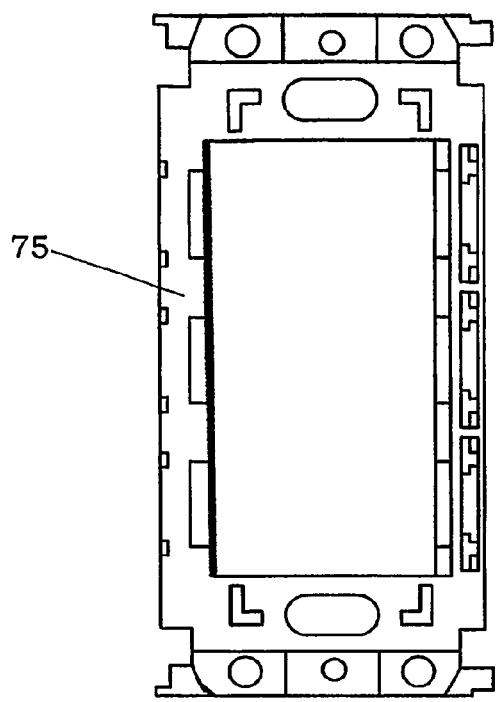
FIG. 9 is a plan view of an attachment plate for fixing the base unit to a switch box.

In the above explanation, the base unit 3 is directly fixed to the switch box 2. If necessary, the base unit 3 may be fixed to the switch box 2 through an attachment plate 75, for example, as shown in FIG. 9. In this case, after hooks formed at both sides of the attachment plate 75 are engaged to toe base unit 3, the attachment plate 75 with the base unit 3 is fixed to the switch box 2 by use of mounting screws. Alternatively, the base unit 3 may be directly fixed in the wall surface by use of exclusive clamps without using the switch box 2. After the base unit is mounted ire the wall surface, the receptacle cover 11 and the cosmetic cover 12 are attached to the front surface of a housing 10 of the base unit 3.

Figure 10B:
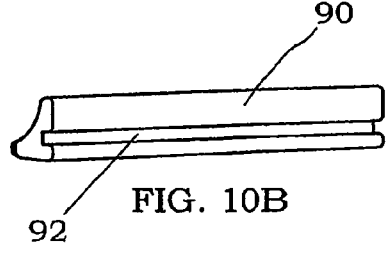
FIG. 10B is a perspective view of a joining member.
Figure 10A:
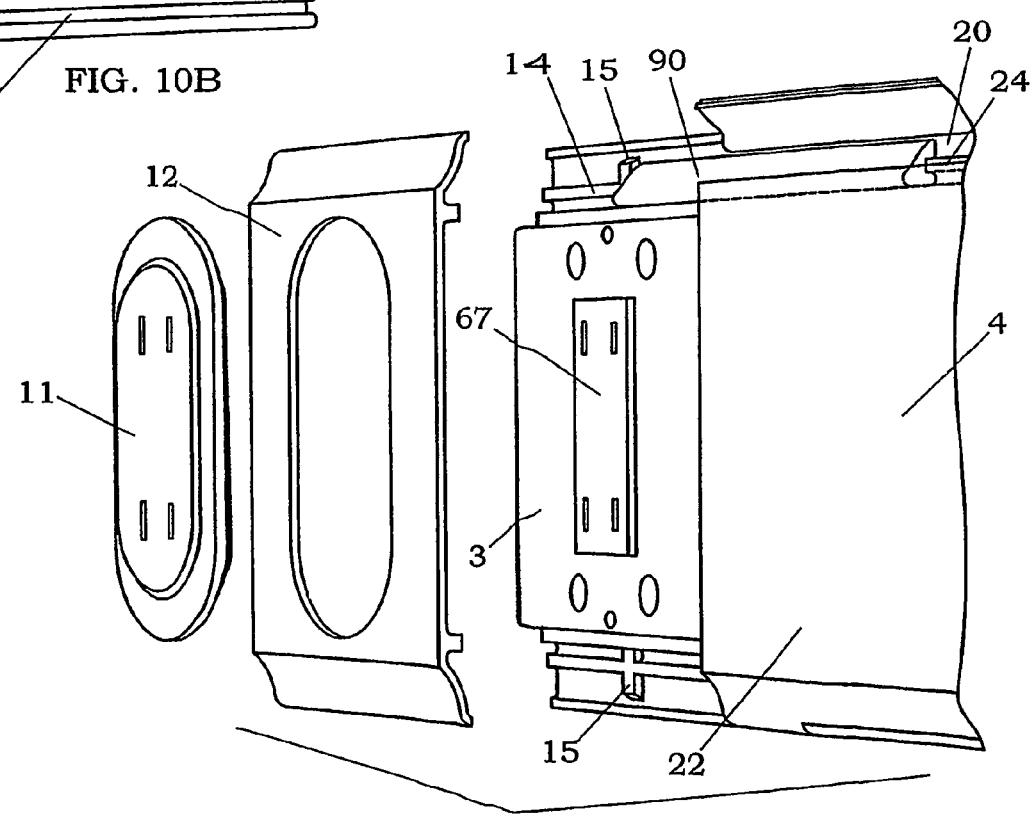
FIG. 10A is an exploded perspective view illustrating how to connect the function unit to the base unit.

The function unit 4 can be attached to the base unit 3, as shown in FIG. 10A. That is, the cosmetic cover 12 is firstly removed from the base unit 3. In this embodiment, since the receptacle cover 11 is separately formed from the cosmetic cover 12, the function section 67 such as the power receptacle can be protected from an accidental breakage by the receptacle corer 11 during the connecting and disconnecting operation for the function unit 4. After the function unit 4 is arranged on the side surface of the base unit 3 such that the electromagnetic coupling portion X and the optical coupling portion Y of the function unit 4 axe in the face-to-face relation with them of the base unit 3, the function unit 4 is mechanically coupled to the base unit 3 by use of a joining member 90. The housing (10, 20) of each of the base unit 3 and the function unit 4 has horizontal guide rails (14, 24) at its upper and lower end portions. The numeral 15 designates a stopper wall formed in a substantially center position in the longitudinal direction of the guide rail 14. On the other hand, as shown in FIG. 10B, the joining member 90 has a groove 92, in which the guide rails (14, 24) can be fitted.

As shown in FIG. 10A, on the condition that the guide rail 14 is fitted in the groove 92, a slide movement of the joining member 90 is performed until the joining member 90 contacts the stopper wall 15. As a result, the joining member 90 is engaged to the base unit 3 over about half length of the joining member. On the other hand, the joining member 90 is also engaged to the function unit 4 in a similar manner to the above over the remaining length of the joining member. Thus, after the engagements between the joining member 90 and the base unit 3 and between the joining member 90 and the function unit 4 are finished at both of the upper and lower end portions, cosmetic covers (12, 22) are attached to the front surfaces of the base unit and the function unit. Since the joining member 90 is held between the cosmetic covers (12, 22) and the housings (10, 20) of the base unit 3 and the function unit 4, it is possible to prevent accidental falling of the joining member 90, and obtain the stable mechanical connection therebetween without spoiling the beauty of them.

The followings are modifications of means for obtaining the stable mechanical connection between the base unit 3 and the function unit 4 or between the adjacent function units 4.

As shown in FIGS. 11A to 11C, the function unit 4 according to a first modification of this embodiment has a pair of male and female connectors (25, 27) at its both sides, each of which is comprised of the electromagnetic coupling portion X and the optical coupling portion Y. In this case, the male and female connectors cain be regarded as the module connector and port. Since the base unit 3 has the same male and female connectors to make the connection with the function unit 4, the electric power transmission and the signal transmission between the base unit and the function unit are performed in a non-contact manner by means of the electromagnetic and optical couplings. For example, the male connector 25 is detachably connected to a female connector formed in the base unit 3, and the female connector 27 is detachably connected to a male connector formed on another function unit 4. In addition, this function unit 4 has a horizontal groove 26, in which a joining member 90A having in a similar cross section to the groove 26 can be fitted. As in the case of the joining member 90 of FIG. 10B, one end of the joining member 90A is inserted into the groove 26 of the function unit 4 over about half length of the joining member, and also the other end of the joining member 90A is inserted into a groove formed in an adjacent base unit 3 or another function unit 4 over the remaining half length of the jointing member to provide the stable mechanical connection therebetween.

In this modification, since the groove 26 has a substantially trapezoidal section configured such that an opening formed in the rear surface of the function unit 4 corresponds to a narrow side of the trapezoidal section, the falling of the joining member 90A from the groove 26 can be prevented without using the cosmetic cover. In addition, the user can be accessed to the joining member 90A through the opening of the rear surface of the function unit 4, it is possible to easily perform the slide movement of the joining member 90A in the groove 26. The shape of the groove is not limited to the trapezoidal section on the condition that the joining member 90A can not removed from the opening formed in the rear surface of the function unit 4.

As shown in FIG. 12A, only the electromagnetic coupling portion X may be formed by the female and male connectors. To ensure the function expandability of the function unit 4, when the male connector is provided at one side of the function unit, the female connector is provided at the other side thereof. Alternatively, as shown in FIG. 12B, each of the electromagnetic coupling portion X and the optical coupling portion Y may be formed by female and male connectors configured in arcuate recess and projection. Thus, when the use of the female and male connectors provides accurate positioning between the adjacent function units, and consequently the reliability of the supply of electric power and the input and output of the information signal is improved.

As a second modification of this embodiment, it is preferred that each of the upper and lower end portions of the function units 4 has a tapered end 21 with an engaging groove 23, and a joining member 90B is configured to slidably contact the tapered end 21 and have a hook 93 at its one end, which can be fitted in the engaging groove 23, as shown in FIG. 13A. In this case, after the joining member 90B is fitted to the tapered end 21 at each of the upper and lower ends of the function unit, the joining member 90B is slid toward an adjacent function unit, as shown by the arrows in FIG. 13A. As a result, the stable mechanical connection between the adjacent function units 4 can be obtained by use of this joining member 90B, as shown in FIG. 13B.

As a third modification of this embodiment, it is preferred that each of the upper and lower end portions of the function unit 4 has a concave portion 28 for accommodating a joining member 90C, and a cover member 16 pivotally supported at its one end to the housing 20 of the function unit 4, as shown in FIGS. 14A to 14C. The joining member 90C has a groove 92C, in which a guide rail 24C formed in the concave portion 28 can be slidably fitted. In this case, after the cover member 16 is opened to access the joining member 90C, the joining member is slid along the guide rail 24C, as in the case of FIG. 10A. Finally, the cover is closed to obtain the stable mechanical connection between the adjacent function units 4. In addition, since the joining member 90C is always accommodated in the concave portion 28, there is no worry about loss of the joining member.

As an information-signal transmitting method available in the dual wiring system of the present invention, one of baseband transmission and broadband transmission can be used. In addition, the protocol is not limited to a specific one. For example, sound and visual information signals may be transmitted and received according to JT-H232 packet to make the mutual communication between the base unit and the handset of the intercom system. In a control system, it is also preferred to use a routing protocol for a broadcast or a unicast that controlling can be performed at a control ratio of 1:1 or 1:N according to operation data. Alternatively, it is preferred that the protocol used between the base units is different from the protocol used in the function unit connected to the base unit, and a protocol conversion is performed at the base unit.

As shown in FIG. 1, since each of the function units 4 having the various kinds of functions can be detachably connected to a desired one of the base units 3 to simultaneously establish both of the power supply from the base unit 3 to the function unit 4 and the mutual communication of the information signal between the base unit 3 and the function unit 4, a general user can easily exchange the function unit 4 already connected to one of the base units 3 for another one of the function units without performing a laborious repair work. In addition, when a plurality of function units 4 are corrected to the base unit 3 along the wall surface, the function expandability can be further improved without spoiling the beauty in the interior spaces. Thus, the base unit for the dual wiring system of the present invention is effective to provide comfortable and convenient living and working environments to meet the user's needs in the information society.

The invention claimed is:

1. A base unit for dual wiring system, which is adapted in use to be mounted in a wall surface of a structure, and connected to both of an electric power line and an information line installed in said structure,
   wherein the base unit has one of a module connector and a module port, which is detachably connected to the other one of said module connector and said module port formed in a function unit to simultaneously establish both of supplying the electric power from the base unit to said function unit, and making a signal transmission between the base unit and said function unit, thereby enabling said function unit to provide at least one of functions for supplying an electric power from said electric power line, outputting information from said information line, and inputting information into said information line,
   wherein the base unit has a housing, which is formed with a rear portion having terminals to be connected to said electric power line and said information line, front portion having at least one of an outlet configured to receive a power plug of an electric appliance, and a switch configured to turn on/off the electric appliance, and a side portion having the one of said module connector and said module port such that said function unit is detachably connected to the base unit in a direction along said wall surface.

2. The base unit as set forth in claim 1, wherein said module connector and said module port have a pair of an electric power connector and an electric power port, which are detachably connected to each other to supply the electric power from the base unit to said function, unit, and a pair of an information signal connector and an information signal port, which are detachably connected to each other to make the signal transmission between the base unit and said function unit.

3. The base unit as set forth in claim 2, wherein said electric power port and said electric power connector are configured to supply the electric power from the base unit to said function unit by means of electromagnetic coupling, and said information signal port and said information signal connector are configured to make the signal transmission between the base unit and said function unit by means of optical coupling.

4. The base unit as set forth in claim 1, wherein the base unit has a housing, which is formed with a rear portion having terminals to be connected to said electric power line and said information line, and a front portion having the one of said module connector and said module port.

5. The base unit as set forth in claim 1 further comprising a joining means configured to mechanically connect said function unit to the base unit.

6. The base unit as set forth in claim 5, wherein said joining means comprises an engaging portion formed on the base unit, and a joining member configured to slidably contact the engaging portion and make the mechanical connection between the base unit and said function unit when a region of said joining member is engaged to the engaging portion of the base unit and the remaining region of said joining member is engaged to an engaging portion formed on said function unit.

* * * * *